United States Patent
Oku et al.

(10) Patent No.: US 10,077,612 B2
(45) Date of Patent: Sep. 18, 2018

(54) SCREW JOINT FOR STEEL PIPE

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Yousuke Oku, Tokyo (JP); Tatsuya Yamamoto, Tokyo (JP); Masaaki Sugino, Tokyo (JP); Russell Elder, Houston, TX (US)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 561 days.

(21) Appl. No.: 14/424,158

(22) PCT Filed: Sep. 11, 2013

(86) PCT No.: PCT/JP2013/074562
§ 371 (c)(1),
(2) Date: Feb. 26, 2015

(87) PCT Pub. No.: WO2014/045973
PCT Pub. Date: Mar. 27, 2014

(65) Prior Publication Data
US 2015/0240570 A1    Aug. 27, 2015

(30) Foreign Application Priority Data
Sep. 21, 2012    (JP) .................................. 2012-208600

(51) Int. Cl.
*F16L 25/00*    (2006.01)
*E21B 17/042*    (2006.01)
(Continued)

(52) U.S. Cl.
CPC ........ *E21B 17/0423* (2013.01); *F16L 15/002* (2013.01); *F16L 15/06* (2013.01)

(58) Field of Classification Search
CPC .............................. F16L 15/002; F16L 15/007
(Continued)

(56) References Cited

U.S. PATENT DOCUMENTS 2,992,019 A    7/1961  MacArthur
3,856,337 A    12/1974 Ehm et al.
(Continued)

FOREIGN PATENT DOCUMENTS

CN    101040141 A    9/2007
CN    101194126 A    6/2008
(Continued)

OTHER PUBLICATIONS

Extended European Search Report for European Application No. 13838729.5, dated Jun. 14, 2016.
(Continued)

*Primary Examiner* — Aaron M Dunwoody
(74) *Attorney, Agent, or Firm* — Birch, Stewart, Kolasch & Birch, LLP

(57) ABSTRACT

In a screw joint for a steel pipe, a taper angle of a tapered surface of a pin is substantially the same as a taper angle of a tapered surface of a box. In addition, the pin and the box interfere with each other in a radial direction while a seal surface of the pin and a seal surface of the box contact each other in a process of make-up between a male screw portion and a female screw portion, and at least apart of the seal surface of the pin comes into close contact with at least a part of the seal surface of the box over the entire circumference. Moreover, a contact pressure amplification mechanism, which increases a contact pressure between the seal surface
(Continued)

of the pin and the seal surface of the box at the completion of the make-up, is further provided.

17 Claims, 11 Drawing Sheets

(51) Int. Cl.
*F16L 15/00* (2006.01)
*F16L 15/06* (2006.01)

(58) Field of Classification Search
USPC .......................................... 285/333, 334, 390
See application file for complete search history.

(56) References Cited

U.S. PATENT DOCUMENTS

| | | | |
|---|---|---|---|
| 3,870,351 A | | 3/1975 | Matsuki |
| 4,153,283 A | | 5/1979 | Hellmund et al. |
| 4,570,982 A | | 2/1986 | Blose et al. |
| 4,629,224 A | * | 12/1986 | Landriault .......... E21B 17/0423 285/334 |
| 4,696,498 A | * | 9/1987 | Church ............... E21B 17/0423 285/334 |
| 4,736,967 A | | 4/1988 | Mott et al. |
| 5,415,442 A | | 5/1995 | Klementich |
| 5,462,315 A | * | 10/1995 | Klementich ........ E21B 17/0423 285/24 |
| 6,543,816 B1 | * | 4/2003 | Noel ................... E21B 17/0423 285/332.4 |
| 6,581,980 B1 | | 6/2003 | DeLange et al. |
| 8,029,025 B1 | * | 10/2011 | Sivley, IV .......... E21B 17/0423 285/333 |
| 2004/0108710 A1 | | 6/2004 | Carcagno et al. |
| 2004/0108719 A1 | | 6/2004 | Carcagno et al. |
| 2006/0071473 A1 | | 4/2006 | Sivley, IV et al. |
| 2006/0145480 A1 | | 7/2006 | Mallis et al. |
| 2006/0162145 A1 | * | 7/2006 | Verger ................. E21B 17/08 29/525.11 |
| 2007/0236015 A1 | | 10/2007 | Sugino et al. |
| 2011/0241340 A1 | * | 10/2011 | Okada ................. F16L 15/004 285/333 |
| 2014/0084582 A1 | * | 3/2014 | Elder ................. E21B 17/0423 285/334 |

FOREIGN PATENT DOCUMENTS

| | | |
|---|---|---|
| EP | 1 365 183 A1 | 11/2003 |
| JP | 48-99716 A | 12/1973 |
| JP | 60-500457 A | 4/1985 |
| JP | 10-148281 A | 6/1998 |
| JP | 2000-130654 A | 5/2000 |
| JP | 2007-205361 A | 8/2007 |
| UA | 71040 C2 | 11/2004 |
| UA | 98016 C2 | 4/2012 |
| WO | WO 84/02947 A1 | 8/1984 |
| WO | WO 02/059519 A1 | 8/2002 |
| WO | WO 2009/060729 A1 | 5/2009 |

OTHER PUBLICATIONS

International Search Report, dated Nov. 12, 2013, issued in PCT/JP2013/074562.
Office Action issued in Japanese Patent Application No. 2014-536785, dated Dec. 9, 2014.
Chinese Office Action and Search Report, dated Nov. 2, 2015, for Chinese Application No. 201380043220.6, with an English translation of the Search Report.
Ukrainian Notice of Allowance, dated Nov. 24, 2015, for Ukrainian Application No. a201500247.

* cited by examiner

SCREW JOINT FOR STEEL PIPE

TECHNICAL FIELD

The present invention relates to a screw joint for a steel pipe.

Priority is claimed on Japanese Patent Application No. 2012-208600, filed on Sep. 21, 2012, and the content of which is incorporated herein by reference.

BACKGROUND ART

For example, when fossil fuels such as crude oil, natural gas, shale gas, or methane hydrate, and gaseous or liquid underground resources such as ground water or a hot spring are excavated and produced, steel pipes such as oil-well pipes are used. In general, the steel pipes such as the oil-well pipes are connected to each other by a screw joint. The screw joint is largely classified into two types. One type is a coupling type. In the coupling type, two steel pipes in which male screw members (pins) are provided on both ends are connected to each other via a short pipe referred to as a coupling in which female screw members (boxes) are provided on both ends. The other type is an integral type. In the integral type, the pin is provided on one end of the steel pipe, the box is provided on the other end, and two steel pipes are directly connected to each other without using the coupling.

As a screw joint for an oil-well pipe, there is a screw joint according to American Petroleum Institute Standard, that is, a so-called API joint. In addition, there is a premium joint which improves performance to endure more severe environments. Most of the premium joints include not only screw structures required to connect the steel pipes but also sealing mechanisms responsible for sealing performance of gas or liquid. Particularly, when a high pressure fluid is required to be sealed, as the sealing mechanism, a metal touch seal is widely used in which rotationally symmetrical screwless surfaces (seal surfaces) are provided on an outer surface of the pin and the corresponding inner surface of the box respectively and the seal surfaces are fitted to each other.

In the metal touch seal, an outer diameter of the pin is set to be slightly larger than an inner diameter of the box (this diameter difference is referred to as a "seal interference amount"). In the metal touch seal, the pin and the box are fitted and interfere with each other in a radial direction, and thus, elastic restoration forces which try to revert to the original diameters of each of the box and the pin are generated between the box enlarged in diameter and the pin reduced in diameter. The seal surfaces can come into close contact with each other over the entire circumference using the elastic restoration forces. In the metal touch seal, if the seal interference amount is set to be large, the sealing performance can be increased. On the other hand, if the seal interference amount is set to be excessively large, galling occurs on the seal surfaces in a make-up process of the screw joint.

In this way, the sealing performance and the galling-resistant performance of the screw joint are in a conflicting relationship. Particularly, in the screw joint for a steel pipe which is formed of high alloy steel containing large amount of chromium, nickel, or the like, the galling easily occurs, and thus, it is difficult to achieve both the sealing performance and the galling-resistant performance.

Accordingly, many technologies are disclosed which avoid the galling of the seal surfaces while maintaining the sealing performance, that is, without decreasing the seal interference amount (refer to Patent Documents 1 to 6).

For example, in Patent Documents 1 and 2, the related arts which improve a lubricating coating are disclosed. Specifically, in Patent Document 1, a technology is disclosed in which a substrate layer processed with oxalic acid is formed on each surface of a screw portion and a seal surface and a resin coating layer dispersed with molybdenum disulfide or tungsten disulfide is formed on the substrate layer. In Patent Document 2, a technology is disclosed in which a substrate layer of porous zinc or zinc alloy is formed on each surface of a screw portion and a seal surface and a solid lubricating coating or a liquid lubricating coating not containing heavy metal is formed on the substrate layer. According to Patent Documents 1 and 2, the galling-resistant performance is improved.

With respect to a screw joint in which the above-described lubricating coating or the surface treatment coating is formed on each surface of the screw portion and the seal surface, in most cases, attention is needed for handling the lubricating coating or the surface treatment coating. Accordingly, due to rough handling during transport of oil-well pipes to an oil-well site or at the site, defects such as peeling-off of the lubricating coating or peeling-off of the surface treatment coating easily occur.

In Patent Document 3, a technology which devises a shape of a seal surface is disclosed. Specifically, a technology is disclosed in which the seal surface of a box is formed as a tapered surface, the seal surface of a pin is formed as a curved surface, both seal surfaces contact each other in a relatively narrow range, a local contact pressure is increased. And sealing performance is improved.

In Patent Document 4, a technology in which two seal surfaces are formed on an integral type screw joint is disclosed. Specifically, in one seal surface, a pin seal surface is formed as a tapered surface and a box seal surface is formed as a curved surface, and both surfaces contact each other. In the other seal surface, in a reverse relationship, that is, the box is formed as a tapered surface and the pin is formed as a curved surface, and both surfaces contact each other.

In Patent Document 5, a technology in which the pin and box seal surfaces are formed as curved surfaces is disclosed. According to technologies disclosed in Patent Documents 3 to 5, since a high local contact pressure can be obtained if the seal interference amounts are the same as each other, high sealing performance is obtained. Moreover, since a sealing contact portion is formed according to the contact between the tapered surface and the curved surface, stable sealing performance is obtained.

However, in the shapes of the seal surfaces disclosed in Patent Documents 3 to 5, the seal surfaces of each of the pin and box slide while contacting each other at a narrow contact width and a high average contact pressure even in a process in which the screw joint is made-up. Accordingly, galling-resistant performance becomes unfavorable. Particularly in the screw joint formed of high alloy steel containing chromium of 13 mass % or ore, occurrence of the galling becomes unavoidable as long as expensive surface treatment is not applied to the screw joint.

In addition, in Patent Document 6, a technology is disclosed in which the shapes of the seal surfaces of the pin and box are formed as tapered surfaces and contact each other, and the galling-resistant performance is improved.

PRIOR ART DOCUMENT

Patent Document

[Patent Document 1] Japanese Unexamined Patent Application, First Publication No. 2000-130654

[Patent Document 2] Pamphlet of PCT International Publication No. WO 2002/059519

[Patent Document 3] United States Patent Application, Publication No. 2004/108719

[Patent Document 4] Specification of U.S. Pat. No. 4,153,283

[Patent Document 5] Specification of U.S. Pat. No. 3,856,337

[Patent Document 6] Specification of U.S. Pat. No. 4,736,967

DISCLOSURE OF THE INVENTION

Problem that the Invention is to Solve

According to the technology disclosed in Patent Document 6, the tapered surfaces which are seal surfaces contact at a wide contact width in the process in which the screw joint is made-up. Therefore, the average contact pressure between the seal surfaces can be suppressed, and the galling does not easily occur.

However, in the technology disclosed in Patent Document 6, the seal surfaces keep in contact with each other at a wide contact width even after the make-up is completed, and the state where the average contact pressure is decreased is maintained. Accordingly, there is a limit in the sealing performance according to this technology. Moreover if the pressure applied to the seal surfaces is increased, the sealing performance is insufficient, and thus, there is a risk that fluid leakage may occur.

The present invention is made in consideration of the above-described circumstances, and an object thereof is to provide a screw joint for a steel pipe which stably achieves both high galling-resistant performance and sealing performance.

Means for Solving the Problems

The present invention adopts the following aspects for solving the problems and achieving the object.

(1) According to an aspect of the present invention, there is provided a screw joint for a steel pipe including: pin which includes a male screw portion formed by a two-step screw, and a seal surface including a tapered surface and a curved surface adjacent to the tapered surface, the seal surface of the pin being formed on an intermediate portion of the two-step screw; and a box which includes a female screw portion formed by a two-step screw, and a seal surface including a tapered surface and a curved surface adjacent to the tapered surface, the seal surface of the box being formed on an intermediate portion of the two-step screw. A taper angle of the tapered surface of the pin is substantially the same as a taper angle of the tapered surface of the box. In addition, the male screw portion and the female screw portion are made-up by screwing, the pin and the box interfere with each other in a radial direction while the seal surface of the pin and the seal surface of the box contact each other in a process of the make-up, and at least a part of the seal surface comes into close contact with at least a part of the seal surface of the box over the entire circumference. Moreover, a contact pressure amplification mechanism, which increases a contact pressure between the seal surface of the pin and the seal surface of the box at the completion of the make-up compared to a time point during the make-up, is further provided.

(2) In the screw joint for a steel pipe described in (1), the curved surface of the pin may be formed on a tip side or the pin, and the curved surface of the box may be formed on a tip side of the box.

(3) In the screw joint for a steel pipe described in (1), the curved surface of the pin may be formed on a side opposite to a tip side of the pin, and the curved surface of the box may be formed on a side opposite to a tip side of the box.

(4) In the screw joint for a steel pipe described in (1), the curved surface of the pin may be formed to be adjacent to both sides of the tapered surface of the pin, and a length of the tapered surface of the box may be longer than a length of the seal surface of the pin.

(5) In the screw joint for a steel pipe described in (1), the curved surface of the box may be formed to be adjacent to both sides of the tapered surface of the box, and a length of the tapered surface of the pin may be longer than a length of the seal surface or the box.

(6) In the screw joint for a steel pipe described in any one of (1) to (5), a peak contact pressure may be generated in a contact portion between the curved surface and the tapered surface in a contact surface between the seal surface of the pin and the seal surface of the box at the completion of the make-up.

(7) In the screw joint for a steel pipe described in any one of (1) to (6), the contact pressure amplification mechanism may increase the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

(8) In the screw joint for a steel pipe described in any one of (1) to (6), the contact pressure amplification mechanism may increase the contact pressure between the seal surface of the pin and the seal surface of the box by a hook shoulder which is adjacent to either a front side or a rear side of each of the seal surface of the pin and the seal surface of the box.

(9) In the screw joint for a steel pipe described in any one of (1) to (8), the male screw portion and the female screw portion may include a dovetail-shaped screw.

(10) In the screw joint for a steel pipe described in any one of (1) to (9), the taper angle of the tapered surface of the pin and the taper angle of the tapered surface of the box may be 2° to 10°.

Advantage of the Invention

According to the aspects described above, the screw joint for a steel pipe which can stably decrease galling risk of the seal surface and can exhibit stable sealing performance after the make-up is completed can be provided.

BEST MODE FOR CARRYING OUT THE INVENTION

Hereinafter, an embodiment of the present invention will be described in detail with reference to the accompanying drawings.

First, for example, the inventors reviewed in detail causes for galling of a seal surface frequently occurring in a make-up process of a screw joint for a steel pipe formed of high alloy steel containing chromium (Cr) of 13 mass % or more.

Figure 12A:
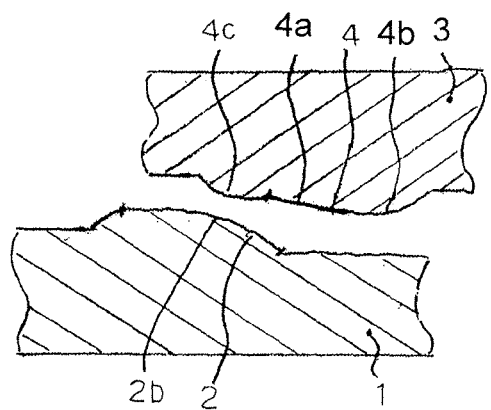
FIG. 12A is a schematic view showing a state before seal surfaces of each of a pin and a box according to a seal shape of the related art are made-up to each other.
Figure 12B:
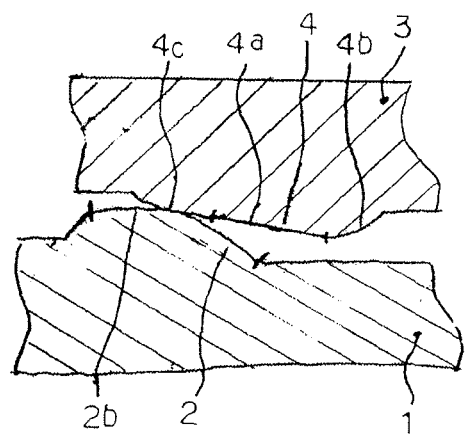
FIG. 12B is a schematic view showing a state in a cake-up process of the seal surfaces of each of the pin and the box shown in FIG. 12A.
Figure 12C:
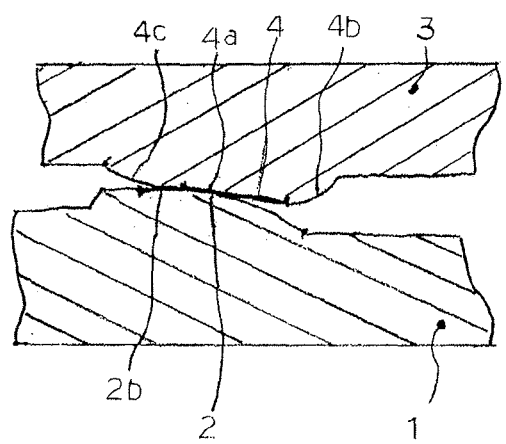
FIG. 12C is a schematic view showing a state when the make-up of the seal surfaces of each of the pin and the box shown in FIG. 12A is completed.

FIG. 12A is a schematic view showing a state before seal surfaces 2 and 4 of each of a pin 1 and a box 3 according to a seal shape of the related art are made-up to each other. FIG. 12B is a schematic view showing a state in a make-up process of the seal surfaces 2 and 4 of each of the pin 1 and the box 3 shown in FIG. 12A. FIG. 12C is a schematic view showing a state when the make-up of the seal surfaces 2 and 4 of each of the pin 1 and the box 3 shown in FIG. 12A is completed. In addition, the right side in FIGS. 12A to 12C is a tip side in the pin 1, and the left side is a tip side in the box 3. Hereinafter, this is similarly applied to all drawings in the present specification.

As shown in FIGS. 12A to 12C, the seal surface 4 of the box 3 is configured of a tapered surface $4a$ and curved surfaces $4b$ and $4c$ which are smoothly connected to both ends of the tapered surface. On the other hand, the seal surface 2 of the pin 1 is configured of single large curved surface $2b$.

A copper plating coating was formed on the box 3 and a screw make-up test was performed. As a result, particularly, it was found that a phenomenon frequently occurred in which the copper plating coating formed on the curved surface $4c$ of the box 3 was significantly worn. In addition, this phenomenon occurred when a screw joint included a screw shape in which a cross-section shape of a thread was a so-called dovetail shape and both loading and stabbing flanks of the thread contacted each other to be made-up when the make-up was completed. That is, this phenomenon occurred significantly in a case of a screw joint in which there was much play until immediately before the make-up was completed.

Accordingly, in order to examine the cause of the wear of the copper plating coating formed on the curved surface $4c$ of the box 3, the inventors reviewed in detail a contact state of the seal surface 4 of a make-up process according to a finite element analysis. As a result, main causes of the galling were found to be the curved surface $4c$ of the box 3 contacting the curved surface $2b$ of the pin 1 when the contact of the seal surface 2 of the pin 1 started, the contact state becoming a linear contact state in which the curved surfaces $4c$ and $2b$ contacted each other at a significantly narrow width, and a high peak contact pressure occurring.

Moreover, when the screw paying a play until immediately before the completion of the make-up was used, since each axis of the pin 1 and the box 3 was shaken and became unstable when the contact between the seal surface 2 of the pin 1 and the seal surface 4 of the box 3 started, it was found that twisting and the galling between the seal surfaces 2 and 4 occurred significantly.

From the above, the inventors obtained findings such as (I) and (II) below.

(I) If an excessive peak contact pressure due to the contact between the curved surfaces $2b$ and $4c$ when the contact between the seal surfaces 2 and 4 starts can be decreased, occurrence of the galling between the seal surfaces 2 and 4 can be prevented.

(II) When the contact between the seal surfaces 2 and 4 starts or in the make-up process, if the contact between the curved surfaces 2b and 4c or between the curved surface 2b and the tapered surface 4a is not a line bar contact and the shapes of the seal surfaces 2 and 4 are appropriately formed so that the tapered surfaces contact each other so as to be parallel, the seal surfaces can uniformly contact each other at a wider contact width, and occurrence of the high peak contact pressure can be prevented.

However, high sealing performance cannot be obtained in a state where the peak contact pressure keeps low after the make-up is completed. In order to obtain high sealing performance, it is necessary to generate a high peak contact pressure in the seal surfaces 2 and 4 at a t me point when the make-up is completed. Moreover, in order to obtain a high peak contact pressure, it is most effective for the curved surfaces 2b and 4c of the seal surfaces 2 and 4 to contact each other. On the other hand, most seal interference amounts are introduced in advance immediately before the make-up is completed. Accordingly, even when the seal surfaces slide to perform the slightly remaining rotation slide until the make-up is completed, there is a high possibility that the galling may occur when it is switched to the contact between the curved surfaces 2b and 4c.

Therefore, the inventors considered that a peak contact pressure having appropriate magnitude in which sufficient sealing performance was exhibited without occurrence of the galling was obtained if the contact pressure between the seal surfaces 2 and 4 was amplified by applying other elements immediately before the make-up was completed, for example, by forming the screw portions of the pin 1 and the box 3 in dovetail-shaped screws and engaging them with each other, by butting against each other hook shoulders provided to be adjacent to the seal surfaces 2 and 4 of the pin 1 and the box 3, or the like, and the contact between the curved surface and the tapered surface was generated at the end of the contact portion between the seal surfaces 2 and 4 while substantially maintaining the contact between the seal surfaces 2 and 4 until the make-up was completed.

The inventors further reviewed based on the above-described conceptions and found that the above-described problems could be solved by satisfying the following two elements (A) and (B), and more prefer fly by satisfying the following element (C) in addition to the elements (A) and (B).

(A) A taper angle of the tapered surface of the pin and a taper made of the tapered surface of the box are substantially the same as each other. Here, both being substantially the same as each other means that the taper angle of the tapered surface of the pin and the taper angle of the tapered surface of the box are the same as each other or an angle difference between both taper angles is within a range of ±0.5°.

(B) A contact pressure amplification mechanism, which increases a contact pressure between the seal surface of the pin and the seal surface of the box at the completion of the make-up compared to a point in time during the make-up, is provided. Here, as the contact pressure amplification mechanism, a dovetail-shaped screw applied to the screw portion or a hook shoulder provided to be adjacent to the seal surfaces of the pin and the box is exemplified, and the dovetail-shaped screw and the hook shoulder will be described below in detail.

(C) The seal surface of the pin is formed at a position which is separated from an end surface of the pin by a fixed distance or more, and the seal surface of the box is formed at a position which is separated from an end surface of the box by a fixed distance or more.

From the above-described findings, the inventors found that high galling-resistant performance and sealing performance could be stably obtained in a make-up process of a screw joint for a steel pipe formed of carbon steel or high alloy steel containing chromium of 13 mass % or more by satisfying the elements (A) to (C).

Moreover, the inventors found that high galling-resistant performance and sealing performance could be stably obtained in a screw joint in which galling easily occurs such as the screw joint for a steel pipe formed of high alloy steel containing chromium of 13 mass % or more as well as the screw joint fora steel pipe formed of carbon steel or sour resistant steel, or a screw joint for a steel pipe such as an integral type screw joint in which an expensive surface treatment is not easily performed, and have completed the present invention.

Next, an example of a premium joint to which a screw joint for a steel pipe (hereinafter, simply referred to as a "screw joint") 10 according to an embodiment of the present invention is applied will be described.

Figure 1:
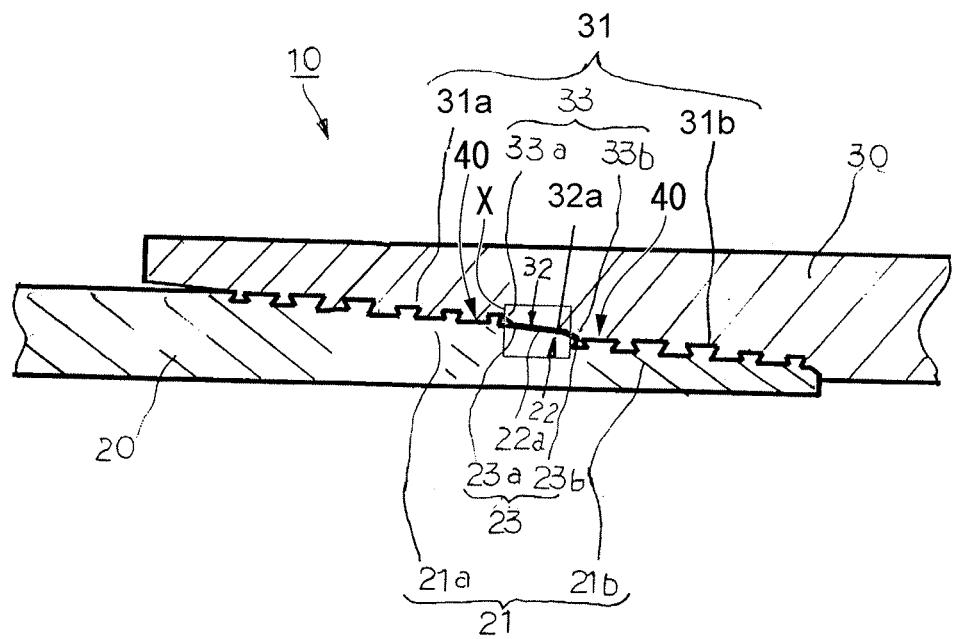
FIG. 1 is a cross-sectional view schematically showing a longitudinal cross-sectional shape of a screw joint for a steel pipe according to an embodiment of the present invention.

FIG. 1 is across-sectional view schematically showing a longitudinal cross-sectional shape of the screw joint 10.

As shown in FIG. 1, the screw joint 10 includes a pin 20 and a box 30.

The pin 20 includes a male screw portion 21 and a seal surface 22. The male screw portion 21 is formed in a spiral on an outer circumferential surface of the pin 20. The male screw portion 21 is formed of a two-step screw which includes an upper-step screw portion 21a and a lower-step screw portion 21b.

The seal surface 22 is formed in an intermediate portion between the upper-step screw portion 21a and the lower-step screw portion 21b. The seal surface 22 is a screwless surface which includes a tapered surface 22a and a curved surface 23 which are formed on the outer circumferential surface of the pin 20.

The tapered surface 22a is inclined by a predetermined angle (hereinafter, referred to as a taper angle of the tapered surface 22a) in an axial cross-section of the pin 20. Accordingly, the tapered surface 22a forms a truncated cone surface in which a diameter is gradually reduced from a base end side of the pin 20 toward a tip side in the outer circumferential surface of the pin 20. For example, the taper angle of the tapered surface 22a is preferably 2° to 10°, and more preferably 3° to 7°.

The curved surface 23 includes a rear curved surface 23a and a front curved surface 23b which are formed to be adjacent to both sides of the tapered surface 22a. The rear curved surface 23a and the front curved surface 23b are formed to draw an arc with a predetermined curvature in the axial cross-section of the pin 20. Accordingly, the curved surface 23 forms a curved curvature rotor surface in the outer circumferential surface of the pin 20. The curvature of the curved surface 23 may be set to form a curved surface which is continuous between a surface opposite to the tapered surface 22a with the interposed curved surface 23 and the tapered surface 22a.

The box 30 includes a female screw portion 31 and a seal surface 32. The female screw portion 31 is formed in a spiral on an inner circumferential surface of the box 30. The female screw portion 31 includes a two-step screw which includes an upper-step screw portion 31a and a lower-step screw portion 31b. The upper-step screw portion 31a of the box 30 is screwed to the upper-step screw portion 21a of the pin 20. And the lower-step screw portion 31b of the box 30 is screwed to the lower-step screw portion 21b of the pin 20.

Accordingly, the male screw portion 21 and the female screw portion 31 are made-up by the screwing.

The seal surface 32 is formed in an intermediate portion between the upper-step screw portion 31a and the lower-step screw portion 31b. The seal surface 32 is a screwless surface which includes tapered surface 32a and a curved surface 33 which are formed on the inner circumferential surface of the box 30.

The tapered surface 32a is inclined by a predetermined angle (hereinafter, referred to as a taper angle of the tapered surface 31a) in an cross-section of the box 30. Accordingly, the tapered surface 32a forms a truncated cone surface in which a diameter is gradually reduced from a base end side of the box 30 toward a tip side in the inner circumferential surface of the box 30. For example, the taper angle of the tapered surface 32a is preferably 2° to 10°, and more preferably 3° to 7°.

The curved surface 33 includes a front curved surface 33a and a rear curved surface 33b which are formed to be adjacent to both sides of the tapered surface 32a. The front curved surface 33a and the rear curved surface 33b are formed to draw an arc with a predetermined curvature in the axial cross-section of the box 30. Accordingly, the curved surface 33 forms a curved curvature rotor surface in the inner circumferential surface of the box 30. The curvature of the curved surface 33 may be set to form a curved surface which is continuous between a surface opposite to the tapered surface 32a with the interposed curved surface 33 and the tapered surface 32a.

In the screw joint 10, in the process of the make-up between the male screw portion 21 and the female screw portion 31, the pin 20 and the box 30 interfere with each other in a radial direction while the seal surface 22 of the pin 20 and the seal surface 32 of the box 30 contact each other, and thus, a structure (metal touch seal) in which at least a part of the seal surface 22 of the pin 20 comes into close contact with at least a part of the seal surface 32 of the box 30 over the entire circumference is obtained.

That is, in the metal touch seal, an outer diameter of the pin 20 is set to be slightly larger than an inner diameter of the box 30 (this diameter difference is referred to as a "seal interference amount"). In the metal touch seal, the pin 20 and the box 30 are fitted and interfere with each other in the radial direction, and thus, elastic restoration forces which try to revert to the original diameters of each of the box 30 and the pin 20 are generated between the box 30 enlarged in diameter and the pin 20 reduced in diameter. The seal surfaces 22 and 32 can come into close contact with each other over the entire circumference using the elastic restoration forces.

Figure 2:
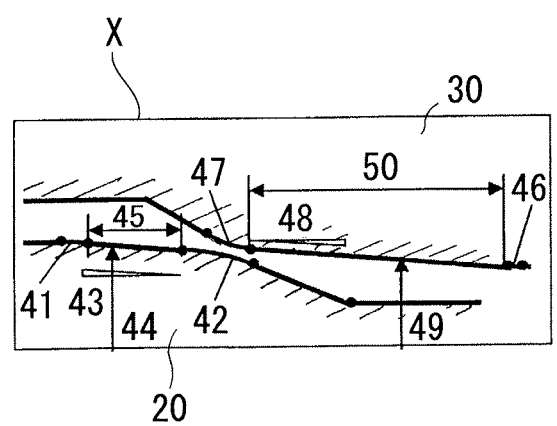
FIG. 2 is a main portion cross-sectional view showing dimensions of each seal portion of a pin and a box of the screw joint for a steel pipe shown by an enclosed portion X in FIG. 1.

FIG. 2 is a main portion cross-sectional view showing dimensions of each seal portion of the pin 20 and the box 30 of the screw joint 10 shown by an enclosed portion X in FIG. 1.

Moreover, in FIG. 2, a reference numeral 41 indicates a radius of curvature of the rear curved surface 23a of the pin 20. A reference numeral 42 indicates a radius of curvature of the front curved surface 23b of the pin 20. A reference numeral 43 indicates the taper angle of the tapered surface 22a of the pin 20. A reference numeral 44 indicates a diameter of the seal surface 22 of the pin 20. A reference numeral 45 indicates a taper length of the seal surface 22 of the pin 20. Moreover, a reference numeral 46 indicates a radius of curvature of the rear curved surface 33b of the box 30. A reference numeral 47 indicates a radius of curvature of the front curved surface 33a of the box 30. A reference numeral 48 indicates the taper angle of the tapered surface 32a of the box 30. A reference numeral 49 indicates a diameter of the seal surface 32 of the box 30. A reference numeral 50 indicates a taper length of the seal surface 32 of the box 30.

The screw joint 10 preferably satisfies the following two elements (A) and (B), and more preferably satisfies the following element (C) in addition to the elements (A) and (B).

(A) The taper angle 43 of the tapered surface 22a of the pin 20 and a taper angle 48 of the tapered surface 32a of the box 30 are substantially the same as each other. Here, both being substantially the same as each other means that the taper angle 43 and the taper angle 48 are the same as each other or the angle difference between both taper angles is within a range of ±0.5°.

(B) A contact pressure amplification mechanism 40, which increases a contact pressure between the seal surface 22 of the pin 20 and the seal surface 32 of the box 30 at the completion of the make-up compared to a point in time during the make-up, is provided. Here, as the contact pressure amplification mechanism 40, the dovetail-shaped screw or the hook shoulder as shown in FIGS. 8 to 11 is exemplified.

(C) The seal surface 22 of the pin 20 or the seal surface 32 of the box 30 is formed at a position which is separated from the end surface of each of the pin 20 and the box 30 by a fixed distance or more. That is, in a two-step screw, the seal surface 22 of the pin 20 and the seal surface 32 of the box 30 are provided in the intermediate portions between the upper-step screw portions 21a and 31a and the lower-step screw portions 21b and 31b. Since the seal surface 22 of the pin 20 and the seal surface 32 of the box 30 are provided in the intermediate portions, the taper angles of the seal surfaces 22 and 32 are constantly maintained in the make-up process and uniform seal contact can be obtained.

Figure 3A:
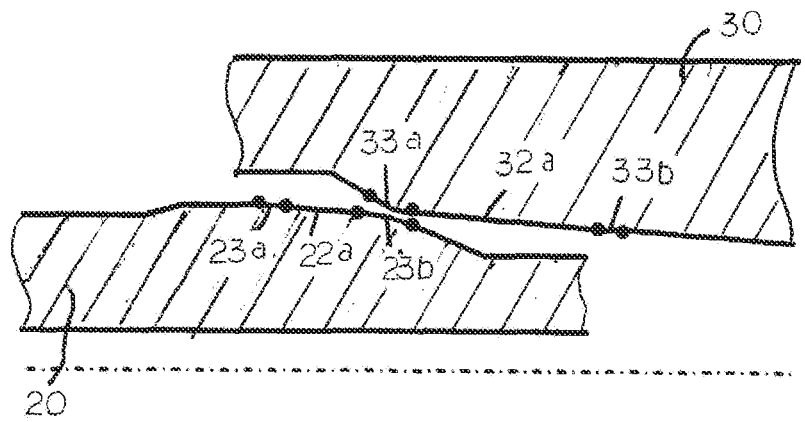
FIG. 3A is a schematic view showing a state before the pin and the box are made-up to each other in the screw joint for a steel pipe shown in FIG. 1.
Figure 3B:
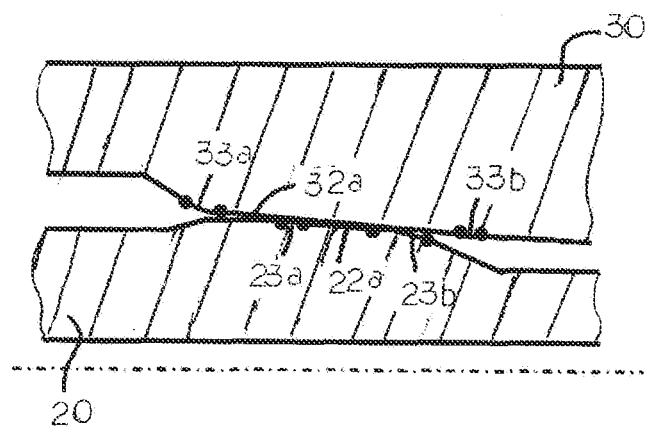
FIG. 3B is a schematic view show king a state when the make-up between the pin and the box is completed in the screw joint for a steel pipe shown in FIG. 1.

FIG. 3A is a schematic view showing a state before the pin 20 and the box 30 are made-up to each other in the screw joint 10 shown in FIG. 1, and FIG. 3B is a schematic view showing a state when the make-up between the pin 20 and the box 30 is completed in the screw joint 10 in FIG. 1.

As shown in FIGS. 3A and 3B, in the seal surfaces 22 and 32 of each of the pin 20 and the box 30, the tapered surfaces 22a and 32a having substantially the same taper angles 43 and 48 are formed, and the tapered surfaces 22a and 32a contact each other so as to be approximately parallel and at a wide width when the contact between the seal surfaces 22 and 32 starts. Accordingly, the element (A) can be relatively easily achieved.

However, if the seal surface 22 is formed in a tip portion including the tip surface of the pin 20, the diameter of the seal surface 22 provided in the tip portion (referred to as a lip) including the tip surface of the pin 20 is reduced by the seal interference amount according to progression of the make-up. Accordingly, a deflection angle (the taper angle 43 of the tapered surface 22a of the pin 20) is increased. On the other hand, the diameter of the box 30 is uniformly increased, and thus, the deflection angle (the taper angle 48 of the tapered surface 32a of the box 30) is almost unchanged. That is, even when the seal surfaces 22 and 32 can contact each other so as to be approximately parallel to each other when the contact starts, influence of the seal interference amount gradually appears according to the make-up, and thus, the taper angles 43 and 48 of the seal surfaces 22 and 32 of each of the pin 20 and the box 30 do not coincide with each other. In this case, it is difficult to keep the seal surfaces 22 and 32 in continuous contact at a wide width in the make-up process.

In order to make the taper angles 43 and 48 of the seal surfaces 22 and 32 continuously coincide with each other even when the influence of the seal interference amount begins to appear, a portion having sufficient stiffness is formed in the further tip side of the seal surface 22 provided in the tip portion of the pin 20, the diameter of the seal surface 22 is uniformly reduced, and occurrence of the deflection angle may be suppressed. Accordingly, forming the seal surface 22 at the position separated from the end surface of the pin 20 by a fixed distance or more is effective.

In the above, the case where the seal surface 22 is provided in the tip portion of the pin 20 is described. However, a case where the seal surface 32 is provided in the tip portion of the box 30 is similarly applied. That is, a portion having sufficient stiffness may be formed in the further tip side of the seal surface 32 of the box 30.

In order to form the portion having sufficient stiffness, as shown in FIG. 1, a so-called intermediate seal structure is adopted, in which the upper-step screw portion 21a and the lower-step screw portion 21b of the male screw portion 21 are formed on both sides of the seal surface 22 and the upper-step screw portion 31a and the lower-step screw portion 31b of the female screw portion 31 are formed on both sides of the seal surface 32.

If the intermediate seal structure is configured as described above, the contact between the tapered surfaces 22a and 32a which are the seal surfaces 22 and 32 is uniformly maintained at a wide contact width even in the make-up process, and risk of the galling is further decreased.

Figure 4A:
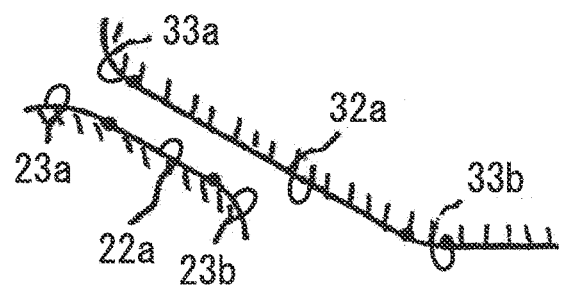
FIG. 4A is a schematic view showing a state before seal surfaces of each of a pin and a box configuring an example of the screw joint for a steel pipe according to the embodiment of the present invention are made-up to each other.
Figure 4B:
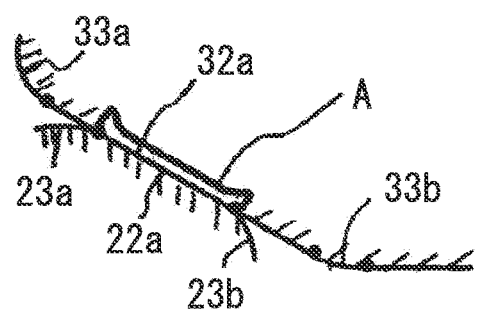
FIG. 4B is a schemata view showing a state in a make-up process of the seal surfaces of each of the pin and the box shown in FIG. 4A.
Figure 4C:
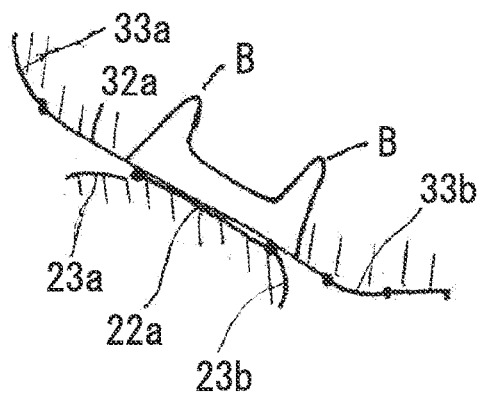
FIG. 4C is a schematic view showing a state when the make-up of the seal surfaces of each of the pin and the box shown in FIG. 4A is completed.

FIG. 4A is a schematic view showing a state before seal surfaces 22 and 32 of each of the pin 20 and the box 30 configuring an example of the screw joint for a steel pipe according to the embodiment of the present invention are made-up to each other. FIG. 4B is a schematic view showing the state in the make-up process of the seal surfaces 22 and 32 of each of the pin 20 and the box 30 shown in FIG. 4A. FIG. 4C is a schematic view showing a state when the make-up of the seal surfaces 22 and 32 of each of the pin 20 and the box 30 shown in FIG. 4A is completed.

Moreover, in FIGS. 4A to 4C, the same reference numerals are attached to the same portion as each portion of the pin 20 and the box 30 configuring the screw joint 10, and the descriptions are omitted. Moreover, a reference numeral A in FIG. 4B shows contact pressure distribution in the make-up process. A reference numeral B in FIG. 4C shows the peak contact pressure when the make-up is completed.

As shown in FIGS. 4A to 4C, the length of the seal surface 22 of the pin 20 is shorter than the length of the tapered surface 32a of the box 30. Accordingly, as shown by the reference numeral A in FIG. 4B in the process of the make-up, the tapered surfaces 22a and 32b can uniformly contact each other at a wider contact width while being in contact with each other so as to be parallel. Therefore, occurrence of a high contact pressure is prevented. And variation of the contact pressure distribution can be suppressed.

On the other hand, at the time point when the make-up is completed, the shorter tapered surface 22a, and the rear curved surface 23a and the front curved surface 23b which are smoothly connected to both ends contact the tapered surface 32a of the box 30. Accordingly, the contact pressure between the seal surfaces 22 and 32 is increased immediately before the make-up is completed. Moreover, when the make-up is completed, as shown by the reference numeral B in FIG. 4C, the peak contact pressure is generated in which the contact pressures in the portions of the rear curved surface 23a and the front curved surface 23b contacting the tapered surface 32a are higher than those of other portions.

Accordingly, in the screw joint 10, the risk of the galling of the seal surfaces 22 and 32 can be stably decreased, and sealing performance can be stably exhibited after the make-up is completed.

Next, another example of the screw joint for a steel pipe according to the embodiment of the present invention will be described.

Figure 5A:
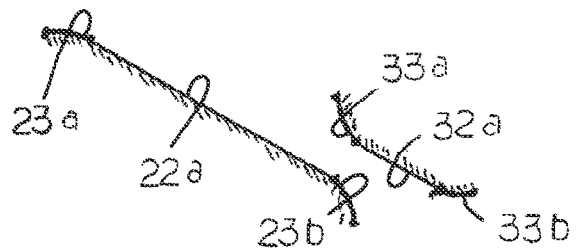
FIG. 5A is a schematic view showing a state before seal surfaces of each of a pin and a box configuring another example of the screw joint for a steel pipe according to the embodiment of the present invention are made-up to each other.
Figure 5B:
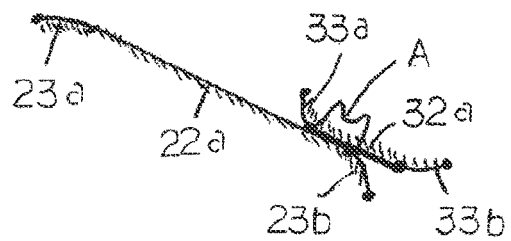
FIG. 5B is a schematic view showing a state in a make-up process of the seal surfaces of each of the pin and the box shown in FIG. 5A.
Figure 5C:
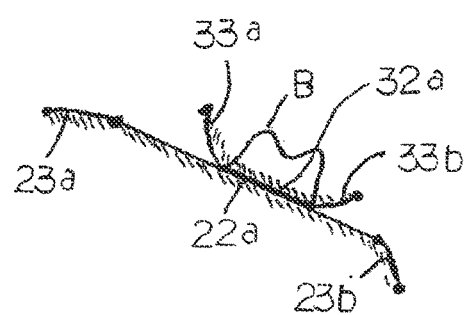
FIG. 5C is a schematic view showing a state when the make-up of the seal surfaces of each of the pin and the box shown in FIG. 5A is completed.

FIG. 5A is a schematic view showing a state before seal surfaces 22 and 32 of each of the pin 20 and the box 30 configuring another example of the screw joint for a steel pipe according to the embodiment of the present invention are made-up to each other. FIG. 5B is a schematic view showing a state in the make-up process of the seal surfaces 22 and 32 of each of the pin 20 and the box 30 shown in FIG. 5A. FIG. 5C is a schematic view showing a state when the make-up of the seal surfaces 22 and 32 of each of the pin 20 and the box 30 shown in FIG. 5A is completed.

Moreover, in FIGS. 5A to 5C, the same reference numerals are attached to the same portion as each portion of the pin 20 and the box 30 configuring the screw joint 10, and the descriptions are omitted. Moreover, a reference numeral A in FIG. 5B shows contact pressure distribution in the make-up process. A reference numeral B in FIG. 5C shows the peak contact pressure when the make-up is completed.

In a way contrary to FIGS. 4A to 4C, in FIGS. 5A to 5C, the front curved surface 33a and the rear curved surface 33b of the box 30 are formed on both sides of the tapered surface 32a, and a length 45 of the tapered surface 22a of the pin 20 is longer than a length 50 of the seal surface 32 of the box 30. Also in this case, the risk of the galling of the seal surfaces 22 and 32 can be stably decreased, and sealing performance can be stably exhibited after the make-up is completed.

Figure 6A:
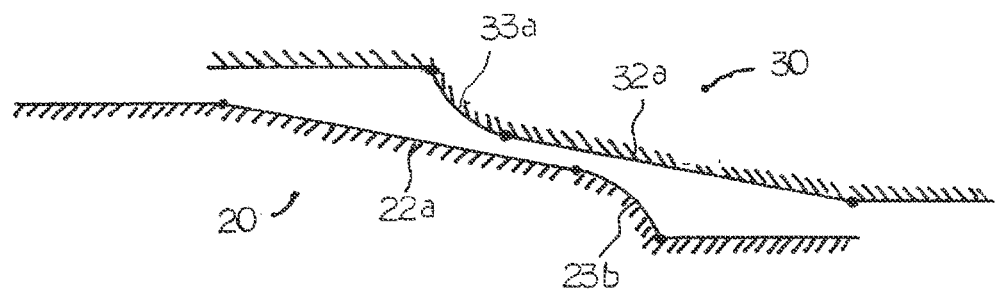
FIG. 6A is a schematic view showing a state before seal surfaces of each of a pin and a box configuring still another example of the screw joint according to the embodiment of the present invention are made-up to each other.
Figure 6B:
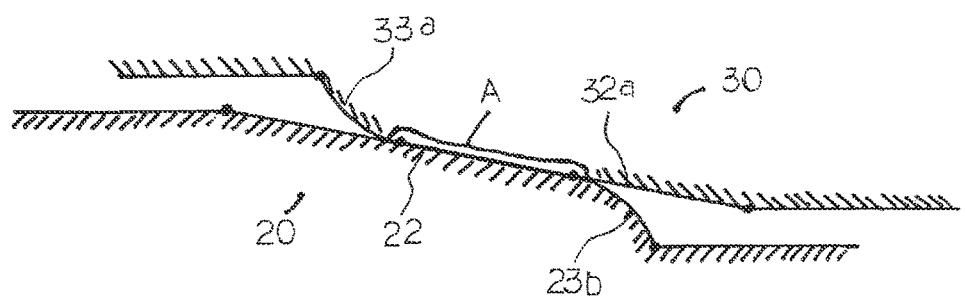
FIG. 6B is a schematic view showing a state in a make-up process of the seal surfaces of each of the pin and the box shown in FIG. 6A.
Figure 6C:
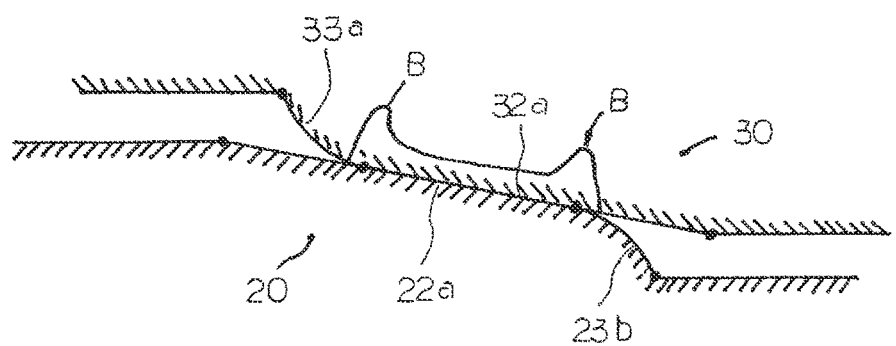
FIG. 6C is a schematic view showing a state when the make-up of the seal surfaces of each of the pin and the box shown in FIG. 6A is completed.

FIG. 6A is a schematic view showing a state before seal surfaces 22 and 32 of each of the pin 20 and the box 30 configuring still another example of the screw joint according to the embodiment of the present invention are made-up to each other. FIG. 6B is a schematic view showing a state in the make-up process of the seal surfaces 22 and 32 of each of the pin 20 and the box 30 shown in FIG. 6A. FIG. 6C is a schematic view showing a state when the make-up of the seal surfaces 22 and 32 of each of the pin 20 and the box 30 shown in FIG. 6A is completed.

Moreover, in FIGS. 6A to 6C, the same reference numerals are attached to the same portion as each portion of the pin 20 and the box 30 configuring the screw joint 10, and the descriptions are omitted. Moreover, a reference numeral A in FIG. 6B shows contact pressure distribution in the make-up process. A reference numeral B in FIG. 6C shows the peak contact pressure when the make-up is completed.

FIGS. 6A to 6C show an aspect in which the seal surfaces 22 and 32 of both of the pin 20 and the box 30 includes tapered surfaces 22a and 32a having substantially the same taper angles 43 and 48 as each other. In addition, in the aspect, the front curved surface 23b is provided in the side which is positioned in the tip side of the pin 20 in the tapered surface 22a of the pin 20, and the front curved surface 33a is provided in the tip side of the box 30 in the tapered surface 32a of the box 30. In this case, even when the lengths 45 and 50 of the tapered surfaces 22a and 32a of both or the pin 20 and the box 30 are the same as each other, uniform contact is maintained at a wide contact width when the contact between the seal surfaces 22 and 32 starts or in the make-up process, and risk of the galling is decreased.

Figure 7A:
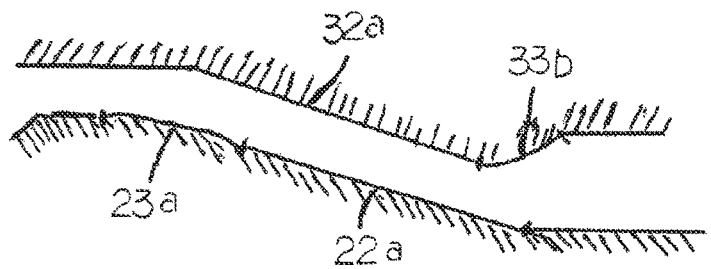
FIG. 7A is a schematic view showing a state before seal surfaces of each of a pin and a box configuring still another example of the screw joint according to the embodiment of the present invention are made-up to each other.
Figure 7B:
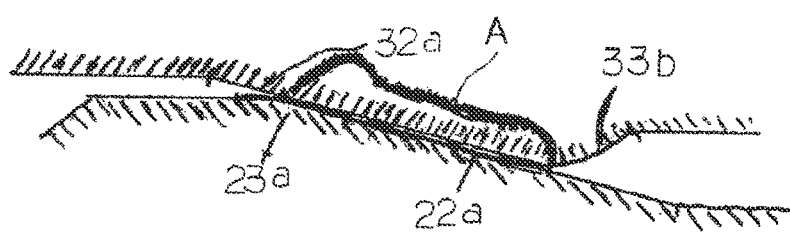
FIG. 7B is a schematic view showing a state in a make-up process of the seal surfaces of each of the pin and the box shown in FIG. 7A.
Figure 7C:
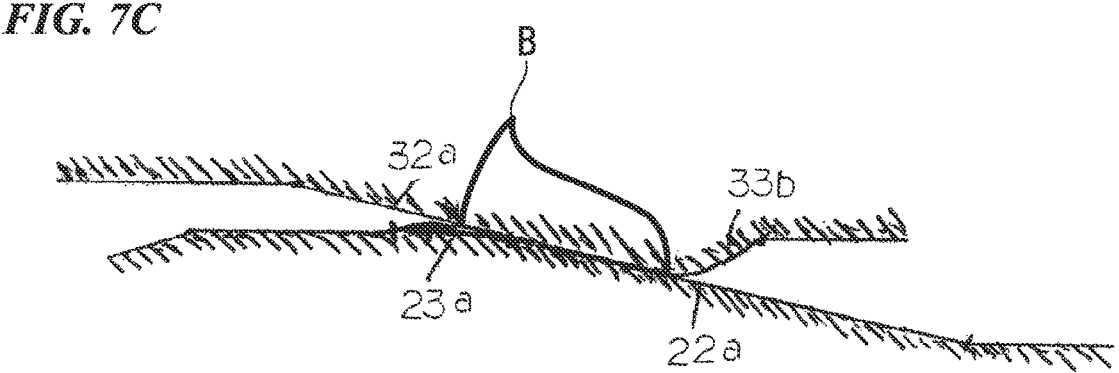
FIG. 7C is a schematic view showing a state when the make-up of the seal surfaces of each of the pin and the box shown in FIG. 7A is completed.

FIG. 7A is a schematic view showing a state before seal surfaces 22 and 32 of each of the pin 20 and the box 30 configuring still another example of the screw joint according to the embodiment of the present invention are made-up to each other. FIG. 7B is a schematic view showing a state in the make-up process of the seal surfaces 22 and 32 of each of the pin 20 and the box 30 shown in FIG. 7A. FIG. 7C is a schematic view showing a state when the make-up of the seal surfaces 22 and 32 of each of the pin 20 and the box 30 shown in FIG. 7A is completed.

Moreover, in FIGS. 7A to 7C, the same reference numerals are attached to the same portion as each portion of the pin 20 and the box 30 configuring the screw joint 10, and the descriptions are omitted. Moreover, a reference numeral A in FIG. 7B shows contact pressure distribution in the make-up process. A reference numeral B in FIG. 7C shows the peak contact pressure when the make-up is completed.

FIGS. 7A to 7C show an aspect in which the seal surfaces 22 and 32 of both of the pin 20 and the box 30 includes tapered surfaces 22a and 32a having substantially the same taper angles 43 and 48 as each other. In addition, in the aspect, the rear curved surface 23a is provided in the side opposite to the tip side of the pin 20 in the tapered surface 22a of the pin 20, and the rear curved surface 33b is provided in the side opposite to the tip side of the box 30 in the tapered surface 32a of the box 30. In this case, even when the lengths 45 and 50 of the tapered surfaces 22a and 32a of the seal surfaces 22 and 32 of both of the pin 20 and the box 30 are the same as each other, uniform contact is maintained at a wide contact width when the contact between the seal surfaces 22 and 32 starts or in the make-up process, and risk of the galling is decreased.

According to the aspect shown in FIGS. 7A to 7C, at the beginning of the make-up, that is, at the starting of the contact between the seal surfaces 22 and 32 and in the make-up process following it, the tapered surfaces 22a and 32a having the taper angles in the seal surfaces 22 and 32 of the pin 20 and the box 30 contact each other so as to be parallel, the contact between the curved surfaces 23 and 33 in the make-up process is not generated, and thus, the peak contact pressure can be decreased.

Next, the contact pressure amplification mechanism 40 having the screw joint 10 will be described.

The contact pressure amplification mechanism 40 is a mechanism which increases a seal contact force immediately before the make-up is completed and amplifies the contact pressure, and with respect to the mechanism increasing the seal contact force, some mechanisms are considered. In one mechanism, screw shapes of each of the male screw portion 21 and the female screw portion 31 may be formed in dovetail-shaped screws.

Figure 8:
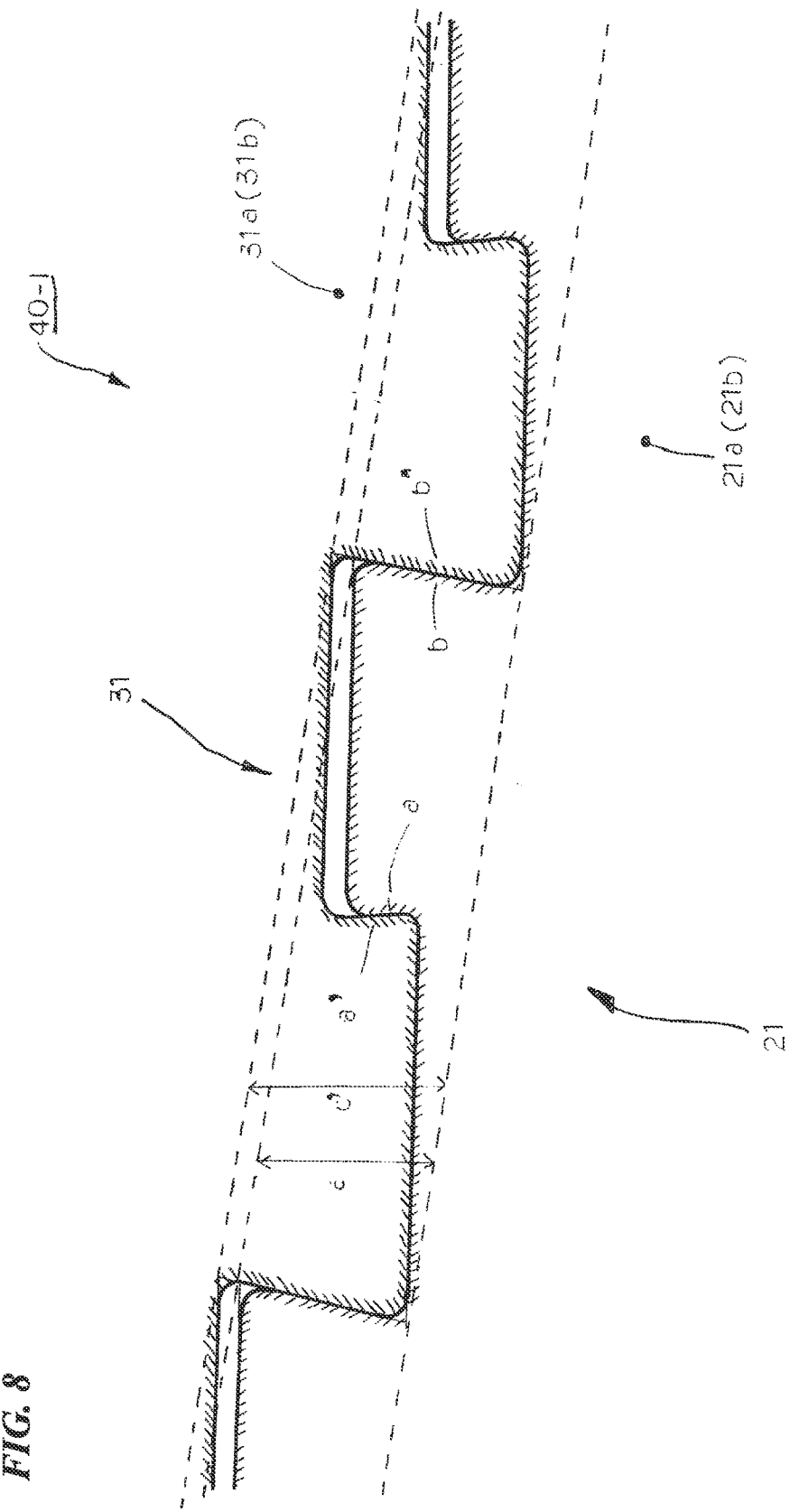
FIG. 8 is a schematic view showing a configuration example of a dovetail-shaped screw.

FIG. 8 is a schematic view showing a configuration example of a representative dovetail-shaped screw 40-1. In addition, in FIG. 8, reference numerals a and a' indicate loading flanks of the thread. Reference numerals b and b' indicate stabbing flanks of the thread. Reference numerals c and c' show thicknesses occupied by the screw.

In the contact pressure amplification mechanism 40, the dovetail-shaped screws 40-1 adjacent to the seal surfaces 22 and 32 are locked to each other by caulking both loading and stabbing flanks of the screw immediately before the make-up is completed, and the contact force between the seal surfaces 22 and 32 is increased. Accordingly, for example, as shown by the reference numeral B in FIG. 4C, when the make-up is completed, in the portion in which the curved surfaces 23a and 23b contact the tapered surface 32a, the peak contact pressure having the higher contact pressure than those of other portions can be generated.

At least one dovetail-shaped screw 40-1 may be provided in places adjacent to the seal surfaces 22 and 32 of the upper-step screw portion 21a and 31a and the lower-step screw portion 21b and 31b. The dovetail-shaped screw 40-1 is preferably formed by at least 1.5 pitches to be adjacent to the seal surfaces 22 and 32. However, the entirety of the male screw portion 21 (21a and 21b) and the female screw portion 31 (31a and 31b) is more preferably the dovetail-shaped screw 40-1.

Moreover, the dovetail-shaped screw 40-1 shown in FIG. 8, a surface of thread crest and a surface of the thread root is parallel to a joint axis L. In this case, heights of the loading flanks a and a' of the thread is lower than heights of the stabbing flanks b and b', and the larger the taper angle and wider the gap between surfaces or the thread crest are, the lower the heights of the loading flanks a and a' are.

On the other hand, in a case where the surface of thread crest and the surface of the thread root are parallel to a taper line of the screw, the loading flanks a and a' can be set to be increased to a full limit of the occupying thickness range (width in a radial direction between the pitch lines including the surface of thread crest and the surface of thread root) of the applied screw. Compared to the dovetail-shaped screw 40-1, a force (force which amplifies the seal contact force immediately before the make-up), which fastens the pin 20 and the box 30 in the radial direction when the screw is engaged, can be further improved. Accordingly, if the dovetail-shaped screw 40-1 is used, the effects of the contact pressure amplification mechanism 40 are further increased. Moreover, it is more preferable that both of the male screw portion 21 (21a and 21b) and the female screw portion 31 (31a and 31b) be the tapered screw and the dovetail-shaped screw.

For example, as another mechanism configuring the contact pressure amplification mechanism 40, there is a hook shoulder which is provided to be adjacent to either the front side or the rear side of each of the seal surfaces 22 and 32 of the pin 20 and the box 30 or to both sides thereof.

Figure 9:
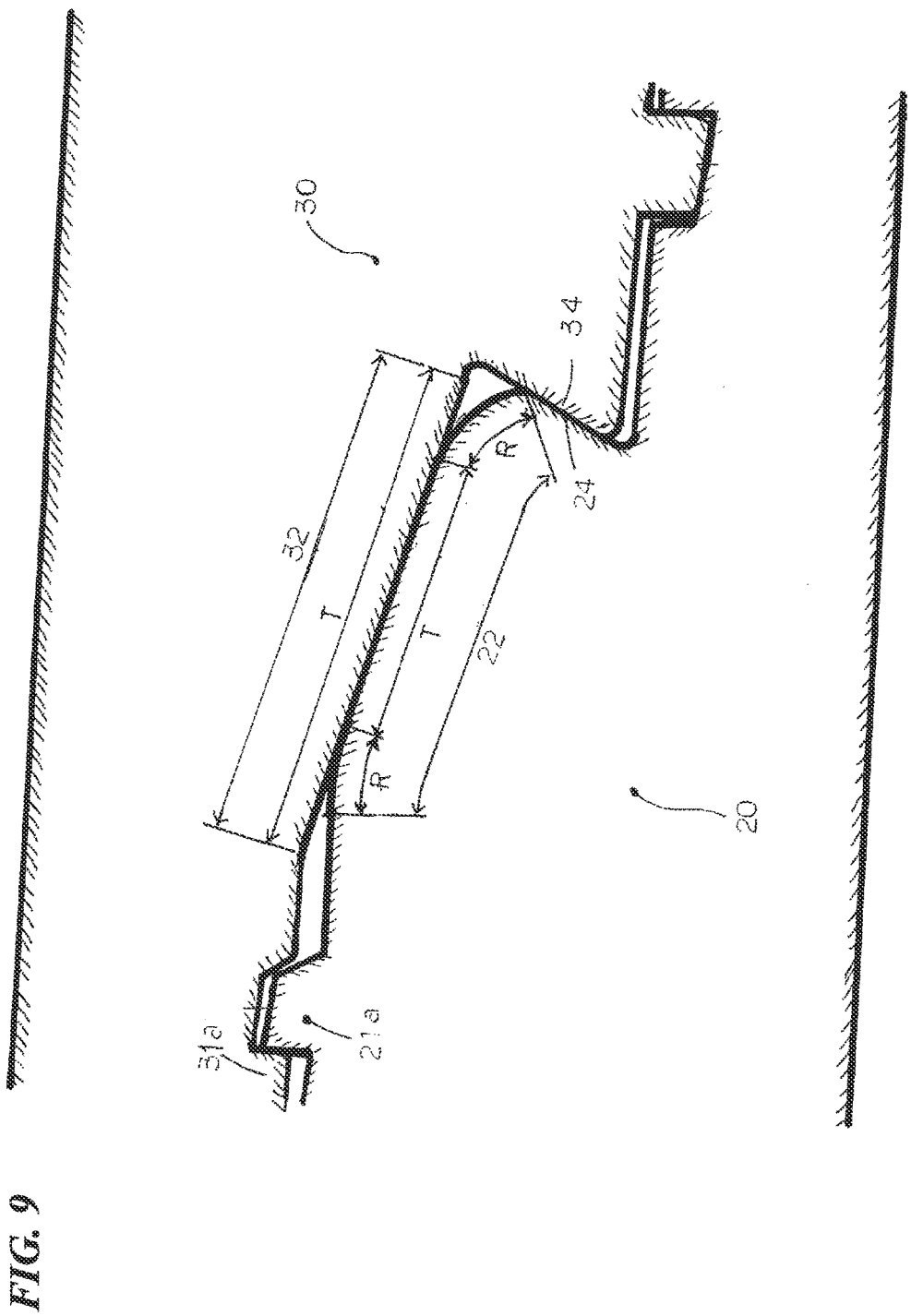
FIG. 9 is a schematic view showing an example when one hook shoulder is provided to be adjacent to either the front side or the rear side of each of the seal surfaces of the pin and the box.
Figure 10:
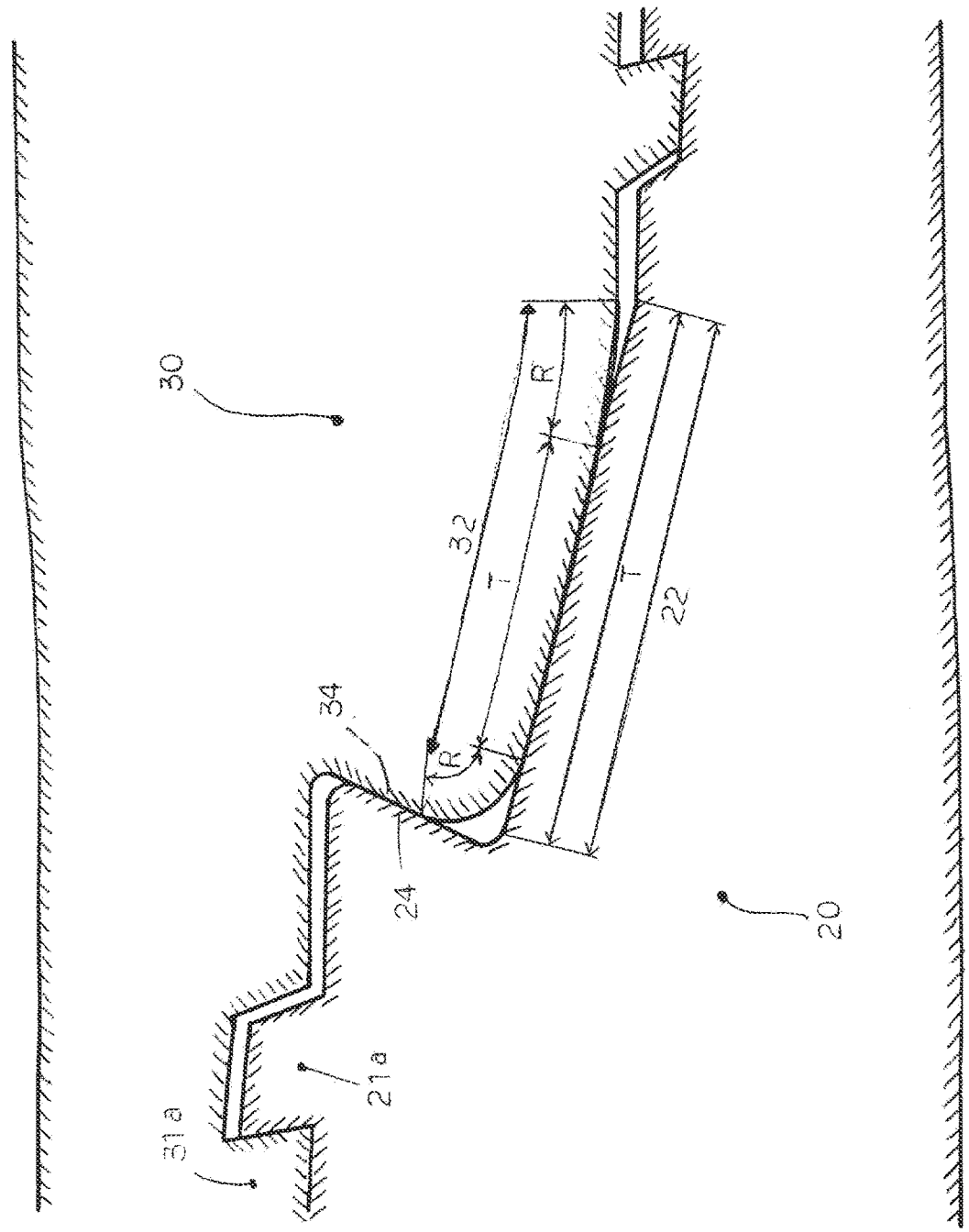
FIG. 10 is a schematic view showiest another example when one hook shoulder is provided to be adjacent to either front side or the rear side of each of the seal surfaces of the pin and the box.
Figure 11:
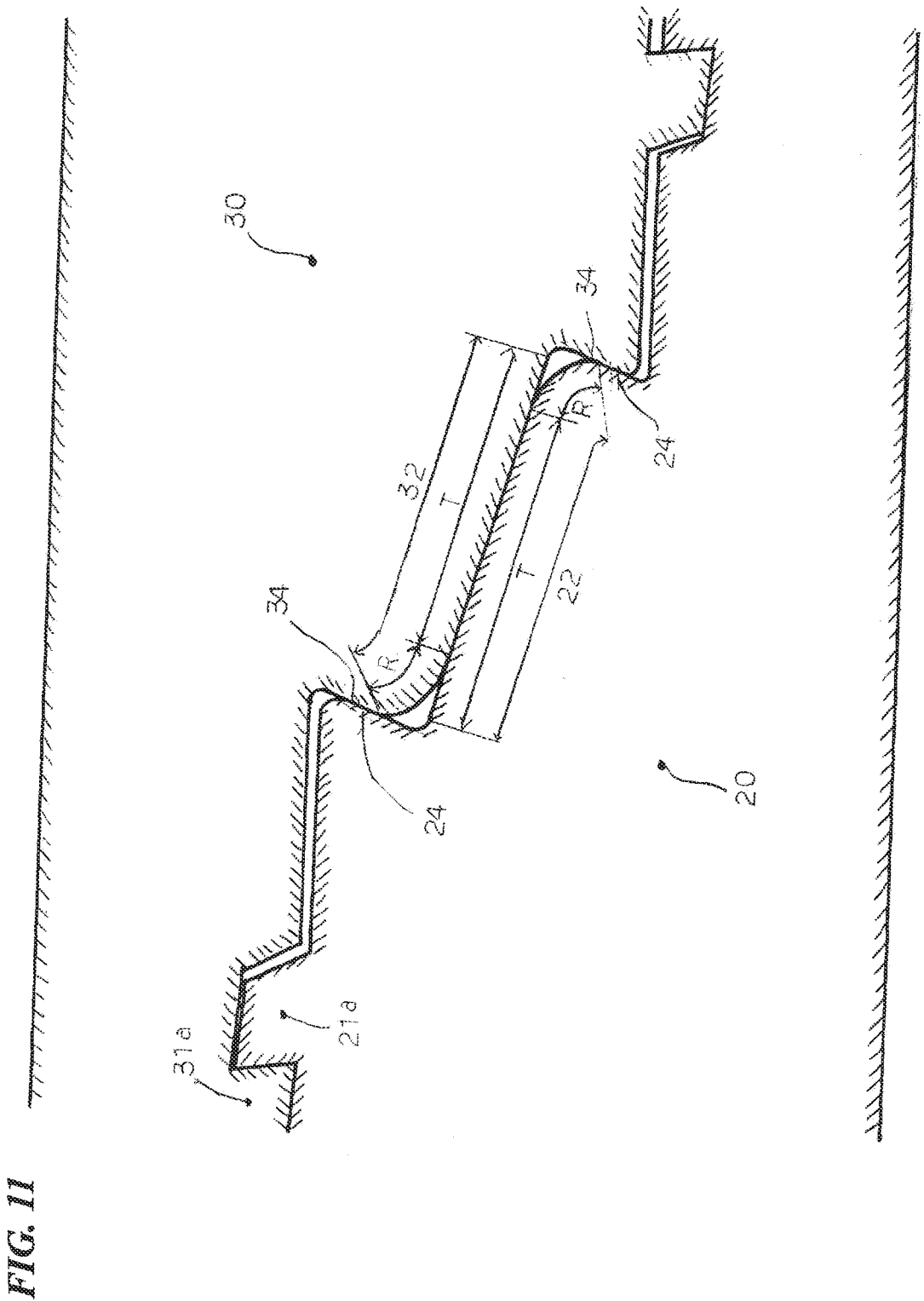
FIG. 11 is a schematic view showing a case where two hook shoulders are provided to be adjacent to the front side and the rear side of the seal surfaces of the pin and the box.

FIGS. 9 to 11 are schematic views showing an example of the hook shoulder. In the drawings, FIGS. 9 and 10 are schematic views showing a case where one hook shoulder is provided to be adjacent to either the front side or the rear side of each of the seal surfaces 22 and 32 of the pin 20 and the box 30. On the other hand, FIG. 11 is a schematic view showing a case where two hook shoulders are provided to be adjacent to the front side and the rear side of the seal surfaces 22 and 32 of the pin 20 and the box 30.

Moreover, in FIGS. 9 to 11, the reference numeral 20 indicates the pin. The reference numeral 30 indicates the box. The reference numeral 22 indicates the seal surface of the pin 20. A reference numeral 24 indicates a shoulder surface of the pin 20. The reference numeral 2a indicates a male screw of the pin 20. The reference numeral 32 indicates the seal surface of the box 30. A reference numeral 34 indicates a shoulder surface of the box 30. The reference numeral 31a indicates a female screw of the box 30. A reference numeral T indicates the tapered surfaces 22a and 32a on the seal surfaces 22 and 32. A reference numeral R indicates the curved surface on the seal surfaces 22 and 32.

If the hook shoulder surfaces 24 and 34 are provided to be adjacent to either the front side or the rear side of each of the seal surfaces 22 and 32 or both sides thereof, a radial component of a reaction force generated by butting of the shoulders is operated in a direction in which the seal surfaces 22 and 32 come into further close contact, and the seal contact force can be increased.

EXAMPLE

In the present example, in order to demonstrate effects of the present invention, by performing finite element analysis and actual make-up test with respect to screw joints for a steel pipe having four types of seal shapes shown in Tables 1A and 1B in the intermediate portion of a two-step screw having an upper step and a lower step in a screw joint, galling-resistant performance and sealing performance of the seal surface were evaluated. Here, Tables 1A and 1B show the seal shapes of the pin. Table 2 shows the seal shapes of the box.

TABLE 1A

| No. | Outer diameter of main body of pipe (mm) | Inner diameter of main body of pipe (mm) | Diameter of seal portion (mm) | Taper length of seal portion (mm) | Taper angle (deg) | Radius of curvature (mm) | Radius of curvature (mm) | Remark |
|---|---|---|---|---|---|---|---|---|
| 1 | 139.7 | 111.15 | 127.5 | 0 | 0 | 40 | 0 | Comparative example |
| 2 | 139.7 | 118.62 | 126.8 | 2.2 | 4.8 | 30 | 30 | Comparative example |
| 3 | 139.7 | 111.15 | 127.5 | 6 | 4.8 | 40 | 0 | Present invention |
| 4 | 139.7 | 118.62 | 128.5 | 2 | 4.8 | 10 | 20 | Present invention |

TABLE 1B

| No. | Outer diameter of main body of pipe (mm) | Inner diameter of main body of pipe (mm) | Diameter of seal portion (mm) | Taper length of seal portion (mm) | Taper angle (deg) | Radius of curvature (mm) | Radius of curvature (mm) | Remark |
|---|---|---|---|---|---|---|---|---|
| 1 | 139.7 | 111.15 | 127.1 | 3.9 | 2.9 | 7 | 30 | Comparative example |
| 2 | 139.7 | 118.62 | 126.2 | 2.2 | 4.8 | 20 | 30 | Comparative example |
| 3 | 139.7 | 111.15 | 127.1 | 8.2 | 4.8 | 7 | 0 | Present invention |
| 4 | 139.7 | 118.62 | 128 | 2 | 4.8 | 20 | 2 | Present invention |

First, a procedure of the finite element analysis will be described. The offered screw joint is an integral type premium joint having a dovetail-shaped screw. The specification of the screw joint is shown in Tables 1A and 1B. In the present example, the contact pressures of the seal surfaces at the beginning of the make-up and at the completion of the make-up were focused on by performing analysis simulating the make-up of the screw joint.

13Cr steel (nominal yield strength YS=794 MPa) was used with respect to Nos. 1 and 3 materials. Carbon steel Q125 (nominal yield strength YS=862 MPa (125 ksi)) of API standard was used with respect to Nos. 2 and 4 materials.

Results of the finite element analysis are shown in Table 2.

TABLE 2

| | At the beginning of make-up | | At the completion of make-up | | |
|---|---|---|---|---|---|
| No. | Contact width on seal (mm) | Peak contact pressure/YS | Contact width on seal (mm) | Peak contact pressure/YS | Remark |
| 1 | 1.1 | 1.3 | 1.6 | 1.3 | Comparative example |
| 2 | 1.4 | 1 | 2.9 | 1.3 | Comparative example |
| 3 | 2.7 | 0.3 | 1.6 | 1.9 | Present invention |
| 4 | 2.4 | 0.6 | 2.5 | 1.8 | Present invention |

As is clear from Table 2, at the beginning of the make-up, Nos. 3 and 4 contact widths on seal are increased compared to those of Nos. 1 and 2, and the intended contact start state of the seal can be reproduced. Moreover, the peak contact pressures of the seal surfaces are significantly decreased to be approximately 0.3 YS to 0.6 YS. From the results, in the screw joint to which the present invention is applied, it was found that the seal surfaces had high galling resistant performance.

In Table 2, the contact pressures at the completion of the make-up are also shown. From Table 2, it is found that Nos. 3 and 4 peak contact pressures at the completion of the make-up are approximately two times the YS and are significantly increased compared to Nos. 1 and 2.

From the results, in the screw joint to which the present invention is applied, it was found that the seal surface had sufficient sealing performance at the completion of the make-up.

Next, the actual make-up test will be described. In this test, the galling-resistant performance of the seal surface of the screw joint was evaluated by a repeated make-up/break-out test.

With respect to the galling-resistant performance, in API test standard, by performing the make-up/break-out test with respect to the casing three times or more, it is determined to pass the test if the galling does not occur.

As shown in Table 3, the galling-resistant performance was evaluated according to screw joints having Nos. 1'3', and 4 seal shapes. Moreover, even when Nos. 1' and 3' seal shapes are the same as those of Nos. 1 and 3, since the sizes of Nos. 1' and 3' screw joints are different from those of Nos. 1 and 3, different numbers such as 1' and 3' are assigned. The details of the seal shapes are as shown in Table 1.

As a test sample, a surface treatment was performed on both of the pin and the box by sand blasting and a screw compound of API standard was used for a lubricant.

The results of the repeated make-up/break-out test are collected and shown in Table 3.

TABLE 3

| Size | Seal shape | Number of success of make-up/break-out |
|---|---|---|
| 7⅝"39# | No 1' | 1 |
| 7⅝"39# | No 3' | 10 |
| 5½"23# | No 4 | 4 |

As shown in Table 3, the galling occurred at the second make-up/break-out with respect to No. 1' screw joint. However, the galling of the seal surface did not occur even when the make-up/break-out of three-times or more was performed with respect to the screw joints of Nos. 3' and 4, and thus, it was demonstrated that the screw joint to which the present invention was applied had improved galling-resistant performance.

DESCRIPTION OF REFERENCE NUMERALS AND SIGNS

10: screw joint for steel pipe
20: pin
21: male screw portion
21a: upper-step screw portion
21b: lower-step screw portion
22: seal surface
22a: tapered surface
23: curved surface
23a: rear curved surface
23b: front curved surface
30: box
31: female screw portion
31a: upper-step screw portion
31b: lower-step screw portion
32: seal surface
32a: tapered surface
33: curved surface
33a: front curved surface
33b: rear curved surface
40: contact pressure amplification mechanism

The invention claimed is:

1. A screw joint for a steel pipe comprising:
a pin which includes a male screw portion formed by a two-step screw, and a seal surface including a tapered surface and a curved surface adjacent to the tapered surface, the seal surface of the pin being formed on an intermediate portion of the two-step screw; and
a box which includes a female screw portion formed by a two-step screw, and a seal surface including a tapered surface and a curved surface adjacent to the tapered surface, the seal surface of the box being formed on an intermediate portion of the two-step screw, wherein
a taper angle of the tapered surface of the pin is substantially the same as a taper angle of the tapered surface of the box,
the male screw portion and the female screw portion are made-up by screwing, such that the pin and the box interfere with each other in a radial direction while the seal surface of the pin and the seal surface of the box contact each other in a process of the makeup, whereby at least a part of the seal surface of the pin comes into close contact with at least a part of the seal surface of the box over an entire circumference, and a distribution of the contact pressure on the seal surface during the make-up includes a region where a value of the contact pressure is substantially constant along the axis direction of the seal surface,
a contact pressure amplification mechanism, which increases a contact pressure between the seal surface of the pin and the seal surface of the box at the completion of the make-up compared to a time point during the make-up, is further provided, and
the contact pressure amplification mechanism is configured to increase the contact pressure between the seal surface of the pin and the seal surface of the box by:
make-up between a dovetail-shaped screw which is formed in a place adjacent to the seal surface of the male screw portion and a dovetail-shaped screw which is formed in a place adjacent to the seal surface of the female screw portion, or
a hook shoulder which is adjacent to either a front side or a rear side of each of the seal surface of the pin and the seal surface of the box.

2. The screw joint for a steel pipe according to claim 1, wherein the curved surface of the pin is formed on a tip side of the pin, and the curved surface of the box is formed on a tip side of the box.

3. The screw joint for a steel pipe according to claim 2, wherein a peak contact pressure is generated in a contact portion between the curved surface and the tapered surface in a contact surface between the seal surface of the pin and the seal surface of the box at the completion of the make-up.

4. The screw joint for a steel pipe according to claim 2, wherein the contact pressure amplification mechanism increases the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

5. The screw joint for a steel pipe according to claim 2, wherein the contact pressure amplification mechanism increases a contact pressure between the seal surface of the pin and the seal surface of the box by a hook shoulder which is adjacent to either a front side or a rear side of each of the seal surface of the pin and the seal surface of the box.

6. The screw joint for a steel pipe according to claim 1, wherein the curved surface of the pin is formed on a side opposite to a tip side of the pin, and the curved surface of the box is formed on a side opposite to a tip side of the box.

7. The screw joint for a steel pipe according to claim 6, wherein a peak contact pressure is generated in a contact portion between the curved surface and the tapered surface in a contact surface between the seal surface of the pin and the seal surface of the box at the completion of the make-up.

8. The screw joint for a steel pipe according to claim 6, wherein the contact pressure amplification mechanism increases the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

9. The screw joint for a steel pipe according to claim 1, wherein the curved surface of the pin is formed to be adjacent to both sides of the tapered surface of the pin, and a length of the tapered surface of the box is longer than a length of the seal surface of the pin.

10. The screw joint for a steel pipe according to claim 9, wherein a peak contact pressure is generated in a contact portion between the curved surface and the tapered surface in a contact surface between the seal surface of the pin and the seal surface of the box at the completion of the make-up.

11. The screw joint for a steel pipe according to claim 9, wherein the contact pressure amplification mechanism increases the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

12. The screw joint for a steel pipe according to claim 1, wherein the curved surface of the box is formed to be adjacent to both sides of the tapered surface of the box, and a length of the tapered surface of the pin is longer than a length of the seal surface of the box.

13. The screw joint for a steel pipe according to claim 12, wherein a peak contact pressure is generated in a contact portion between the curved surface and the tapered surface in a contact surface between the seal surface of the pin and the seal surface of the box at the completion of the make-up.

14. The screw joint for a steel pipe according to claim 12, wherein the contact pressure amplification mechanism increases the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

15. The screw joint for a steel pipe according to claim 1, wherein a peak contact pressure is generated in a contact portion between the curved surface and the tapered surface in a contact surface between the seal surface of the pin and the seal surface of the box at the completion of the make-up.

16. The screw joint for a steel pipe according to claim 15, wherein the contact pressure amplification mechanism increases the contact pressure between the seal surface of the pin and the seal surface of the box by make-up between a dovetail-shaped screw which is formed in a place adjacent to the seal surface of the male screw portion and a dovetail-shaped screw which is formed in a place adjacent to the seal surface of the female screw portion.

17. The screw joint for a steel pipe according to claim 1, wherein the taper angle of the tapered surface of the pin and the taper angle of the tapered surface of the box are 2° to 10°.

* * * * *